US012069459B2

(12) United States Patent
Gontcharov et al.

(10) Patent No.: US 12,069,459 B2
(45) Date of Patent: Aug. 20, 2024

(54) LOUDSPEAKER ASSEMBLY WITH A SEPARATE VOICE COIL ASSEMBLY

(71) Applicant: Harman International Industries, Incorporated, Stamford, CT (US)

(72) Inventors: Vladimir Gontcharov, Budapest (HU); Hans-Juergen Regl, Bogen (DE)

(73) Assignee: Harman International Industries, Incorporated, Stamford, CT (US)

( * ) Notice: Subject to any disclaimer, the term of this patent is extended or adjusted under 35 U.S.C. 154(b) by 51 days.

(21) Appl. No.: 17/501,968

(22) Filed: Oct. 14, 2021

(65) Prior Publication Data

US 2022/0124436 A1 Apr. 21, 2022

Related U.S. Application Data

(60) Provisional application No. 63/093,555, filed on Oct. 19, 2020.

(51) Int. Cl.
*H04R 7/12* (2006.01)
*H04R 7/20* (2006.01)
*H04R 9/06* (2006.01)

(52) U.S. Cl.
CPC ............... *H04R 7/127* (2013.01); *H04R 7/20* (2013.01); *H04R 9/06* (2013.01)

(58) Field of Classification Search
CPC . H04R 7/127; H04R 7/20; H04R 9/06; H04R 2307/023; H04R 2307/207
See application file for complete search history.

(56) References Cited

U.S. PATENT DOCUMENTS 5,556,464 A * 9/1996 Tanabe ..................... H04R 7/02 117/106
6,819,773 B2 * 11/2004 D'Hoogh ............... H04R 9/063 381/396
7,844,071 B2 * 11/2010 Funahashi ............ H04R 31/006 381/396
8,009,856 B2 * 8/2011 Funahashi ................ H04R 7/16 381/400
9,866,967 B2 1/2018 Rousseau et al.
10,034,094 B2 * 7/2018 Perkins .................... H04R 9/04
2006/0000666 A1 * 1/2006 Dickie ................... H04R 9/045 181/169
2018/0115830 A1 * 4/2018 Salvatti .................... H04R 9/04

FOREIGN PATENT DOCUMENTS

JP H03292099 * 12/1991 ............... H04R 7/02
WO 2014045008 A2 3/2014

OTHER PUBLICATIONS

Klasco et al., The Voice Coil (Part 1) Parts and Production A look at the bobbin, the voice coil wire, and the collar, www.audiXpress.com, pp. 8-12 (Year: 2012).*

* cited by examiner

*Primary Examiner* — Angelica M McKinney
(74) *Attorney, Agent, or Firm* — Brooks Kushman P.C.

(57) ABSTRACT

In at least one embodiment, a loudspeaker assembly is provided. The loudspeaker assembly includes a supporting ring, a flexible surround, a voice coil, a dome, and a bearing ring. The flexible surround includes a first end being attached to the supporting ring and a second end positioned opposite to the first end. The voice coil is positioned about the flexible surround. The dome is positioned about the voice coil and the second end of the flexible surround. The bearing ring is attached to the voice coil and separates the flexible surround from the dome.

16 Claims, 6 Drawing Sheets

LOUDSPEAKER ASSEMBLY WITH A SEPARATE VOICE COIL ASSEMBLY

CROSS-REFERENCE TO RELATED APPLICATIONS

This application claims the benefit of U.S. provisional application Ser. No. 63/093,555 filed Oct. 19, 2020, the disclosure of which is hereby incorporated in its entirety by reference herein.

TECHNICAL FIELD

Aspects disclosed herein generally relate to a loudspeaker assembly with a separate voice coil assembly. In one example, aspects generally relate to loudspeaker assembly that includes a tweeter (e.g., headrest or miniature loudspeakers) dome (or diaphragm) with a separate voice coil assembly.

BACKGROUND

WO2014045008 to Rousseau provides a diaphragm for a loudspeaker drive unit or for a microphone that includes a rigid dome-shaped member having a thickness that varies from a first thicker thickness at a first location at the periphery of the dome-shaped member to a second thinner thickness at a second location, which is nearer to the center of the dome-shaped member. There is a step-wise change in thickness at a location between the first location and the second location. By providing a greater thickness at the periphery of the dome-shaped member, this aspect may improve stiffness of the diaphragm and may allow for an increased break-up frequency. By having thinner material elsewhere in the dome-shaped member may allow the mass of the diaphragm to be kept low and may result in better acoustic sensitivity.

SUMMARY

In at least one embodiment, a loudspeaker assembly is provided. The assembly includes a supporting ring; a surround, a voice coil, and a dome. The surround is positioned on the supporting ring. The voice coil is positioned about the surround. The dome is positioned about the voice coil. The bearing ring is configured for attachment to the voice coil and separates the surround from the dome.

In at least one embodiment, a loudspeaker assembly is provided. The loudspeaker assembly includes a supporting ring, a flexible surround, a voice coil, a dome, and a bearing ring. The flexible surround includes a first end being attached to the supporting ring and a second end positioned opposite to the first end. The voice coil is positioned about the flexible surround. The dome is positioned about the voice coil and the second end of the flexible surround. The bearing ring is attached to the voice coil and separates the flexible surround from the dome.

In at least another embodiment, a loudspeaker assembly is provided. The loudspeaker assembly includes a supporting ring, a flexible surround, a voice coil, a dome, and a bearing ring. The flexible surround is attached to the supporting ring. The voice coil is positioned about the flexible surround. The dome is positioned about the voice coil and the flexible surround. The bearing ring is attached to the voice coil and separates the flexible surround from the dome.

In at least another embodiment, a loudspeaker assembly is provided. The loudspeaker assembly includes a supporting ring, a flexible surround, a voice coil, a dome, and a bearing ring. The flexible surround includes a first end being attached to the supporting ring and a second end being positioned opposite to the first end. The voice coil is positioned about the flexible surround. The dome is positioned about the voice coil and the second end of the flexible surround. The bearing ring is attached to the voice coil and to the dome and the bearing ring separates the flexible surround from the dome

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
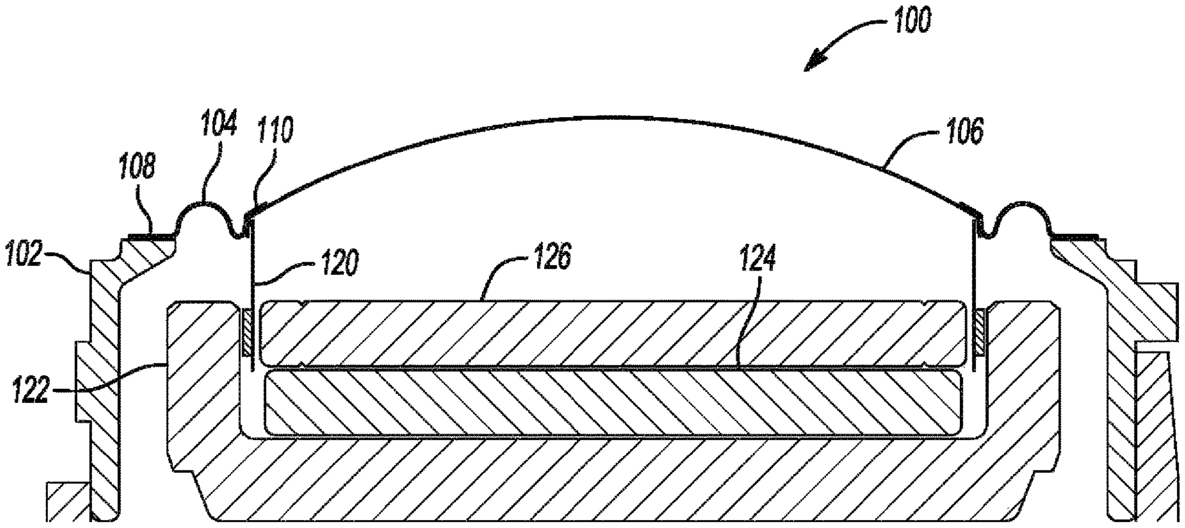
FIG. 1 depicts an example loudspeaker assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that directional terms as noted herein (e.g., "upper", "lower", "inner", "outer", "top", "bottom", etc.) simply refer to the orientation of various components as illustrated in the accompanying figures relative to a loudspeaker assembly. Such terms are provided for context and understanding of the embodiments disclosed herein. It is further recognized that FIGS. 1-11 as set forth herein generally depict cross-sectional views of various loudspeaker assemblies. It is also recognized that the loudspeaker assemblies as set forth herein are generally shaped radially when viewing such assemblies from a top view. It is further recognized that the elements as set forth in the FIGURES are similar in accompanying FIGURES unless otherwise specified in the corresponding text of the present application.

Current loudspeaker assemblies that are assembled as tweeters or other loudspeaker that generate audio in a high frequency range (e.g., over 10 kHz) include, among other things, a dome (or diaphragm) and a soft/pliable surround assembly. The dome and the surround assembly may be adhesively fixed to a voice coil of the assembly. Aspects disclosed herein generally provide a surround as a separate sub-assembly that is positioned on a bearing ring. The surround and the bearing ring may be assembled to the voice coil separately from the dome (or diaphragm). The dome may then be attached (e.g., adhesively coupled) to the loudspeaker assembly (e.g., tweeter) later in a separate process.

Currently loudspeaker assembly designs for tweeter generally involve expensive domes (or diaphragms) (e.g., diamond, Ceramic Metal Matrix Diaphragm (CMMD), etc.) that may be exposed to a higher scrap rate if a portion of that assembly that is not related to the dome itself goes wrong. For example, some of these tweeters may fail in testing due to a complicated or an intricated design of a diamond dome. To address these concerns, the loudspeaker assemblies as disclosed herein provide, among other things, a dome that is separated from the loudspeaker surround via a bearing ring that may lead to, inter alia, a cost savings, a modular transducer concepts, design for assembly and a mechanism to reduce scrap. Additionally, aspects disclosed herein provide for (i) a cost saving in domes in which domes may be changed to a simpler shape, (ii) improved reliability and applicability in a production process and in various loudspeaker assembly designs, and (iii) an increased reinforcement effect may be achieved for the loudspeaker assembly itself.

Other advantages may provide a dome that has a simple shape even if the dome is formed of an expensive part (or materials) which can be attached (e.g., adhesively coupled) to the tweeter in a separate process thereby avoiding manufacturing risks during assembly. Additionally, many domes may be with different materials and with different cosmetic appearances with a bearing ring and surround configuration thereby avoiding the need to have a new component or part which may simply require the dome itself as the new component. Materials that form the dome that require time intensive manufacturing and/or complex processing such as diamond, glass, compounds incorporating carbon fibers, graphene, ceramics that are generally brittle may benefit from the alternate assembly process disclosed herein. The bond interface between the dome and the bearing ring (or coupling ring) may be well defined and may be more tolerant to small dimensional variations of the dome itself.

Figure 2:
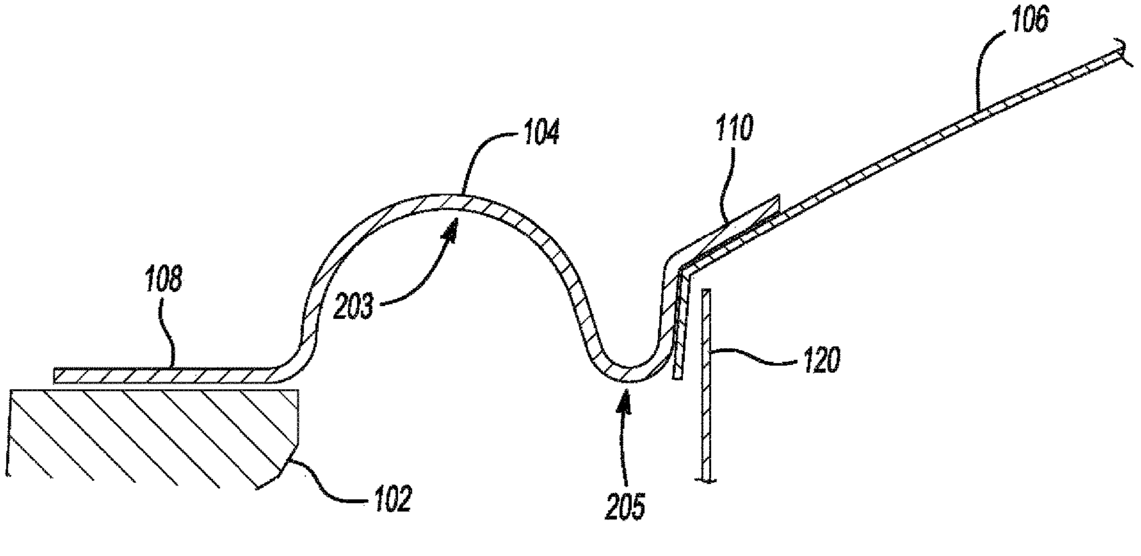
FIG. 2 depicts an interface formed of a surround, a dome, and a voice coil as set forth in FIG. 1.

FIG. 1 generally illustrates an example loudspeaker assembly 100. The assembly 100 includes a supporting ring 102, a surround 104, and a dome (or diaphragm) 106. As generally shown, the surround 104 includes a first end 108 that is coupled to the supporting ring 102 and a second end 110 that is coupled to the dome 106. A voice coil 120 is positioned within the supporting ring 102 and is coupled to an underside of the dome 106. The voice coil 120 is coupled to a shell pot 122. A magnet 124 is supported by the shell pot 122 and a core cap 126 lies on top of the magnet 124. The voice coil 120 sits suspended in air or a ferrofluid in a gap formed between the shell pot 122 and the core cap 126. FIG. 2 generally illustrates another view of an interface formed by the surround 104 and the dome 106 on the loudspeaker assembly 100 of FIG. 1. In general, the surround 104 and the dome 106 may be packaged as a single component prior to being installed on the supporting ring 102. For example, the surround 104 and the dome 106 may be adhesively coupled to one another prior to installation on the supporting ring 102.

Figure 3:
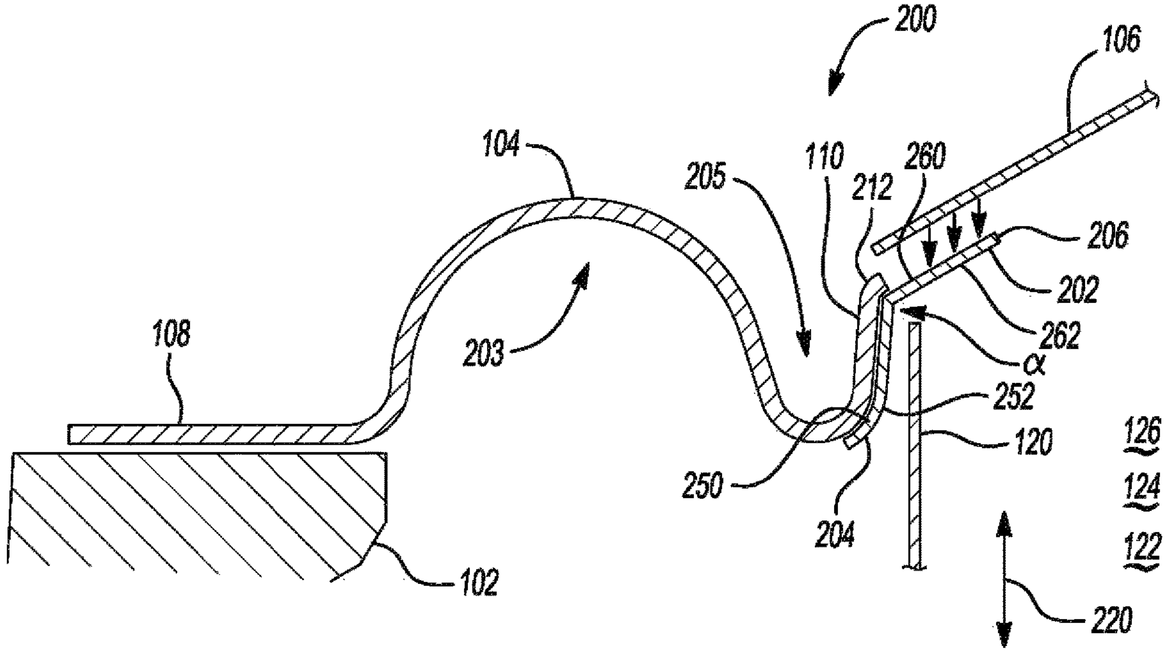
FIG. 3 depicts a loudspeaker assembly in accordance with one embodiment.

FIG. 3 generally illustrates a loudspeaker assembly 200 in accordance with one embodiment. The loudspeaker assembly 200 may be implemented as a tweeter that is arranged to transmit audio signals in a high frequency range of over 10 kHz. It is recognized that the loudspeaker assembly 200 may be implemented as a headrest loudspeaker or other miniature loudspeaker arrangement that transmits audio in the high frequency range. The assembly 200 includes a bearing ring 202, the supporting ring 102, the surround 104, the dome 106, and the voice coil 120. While not illustrated, the assembly 200 also includes the shell pot 122, the magnet 124, and the core cap 126.

The surround 104 is attached to the bearing ring 202 which then serves to separate the dome 106 from the second end 110 of the surround 104. In this case, the surround 104 and the dome 106 are not formed as a subassembly prior to installation on the supporting ring 102. As shown, the surround 104 includes a first radial portion 203 and a second radial portion 205 (see also FIG. 2). The first and the second radial portion 203, 205 generally form a serpentine pattern while viewing FIG. 3 (and other figures disclosed herein) in from a cross-sectional perspective. The second end 110 of the surround 104 is coupled to a lower portion 204 of the bearing ring 202. The dome 106 may then be coupled to an upper portion 206 of the bearing ring 202. The surround 104 includes an extending portion 212 positioned on the second radial portion 205 that is positioned adjacent to the dome 106 when the surround 104 and the dome 106 are attached to the bearing ring 202.

The lower portion 204 generally includes a first side 250 and a second side 252. The extending portion 212 of the surround 104 may be coupled to the first side 250 of the lower portion 204 (or of the bearing ring 202). The second side 252 of the lower portion 204 may be coupled directly to the voice coil 120. The upper portion 206 of the bearing ring 202 includes a first side 260 and a second side 262. The dome 106 is attached to the first side of the upper portion 206. As generally shown, the bearing ring 202 may form a ramp-like structure to provide an interface for coupling the surround 104, the dome 106, and the voice coil 120 to one another. This may be advantageous since this enables the surround 104 and dome 106 to move vertically along axis 220 due to the audio output provided by the assembly 200. The movement (i.e., push-pull movement along the vertical axis 220) enables the assembly to generate the audio output. As also generally shown, the lower portion 204 and the upper portion 206 of the bearing ring 202 generally form an angle, a that is greater than 90 degrees to enable the surround 104 and the dome 106 to move vertically while the assembly 200 generates the audio output. The bearing ring 202 along with, for example, the ramp-like structure and the angle $\alpha$, may enable a reduction in scrap but also improve the audio output characteristics for the assembly 200. For example, the bearing ring 202 adds mechanical strength to the interface formed at the surround 104, dome 106, and voice coil 120 which may yield an improved high frequency acoustic output that is free of modal vibration acoustic contributions or artifacts. The bearing ring 202 increases radial stiffness for the assembly 200 and reduces vibrational deformation of the voice coil 120 and dome 106 which leads to an improved response (e.g., higher usable frequency response limit) for the assembly 200 (or tweeter).

Figure 4:
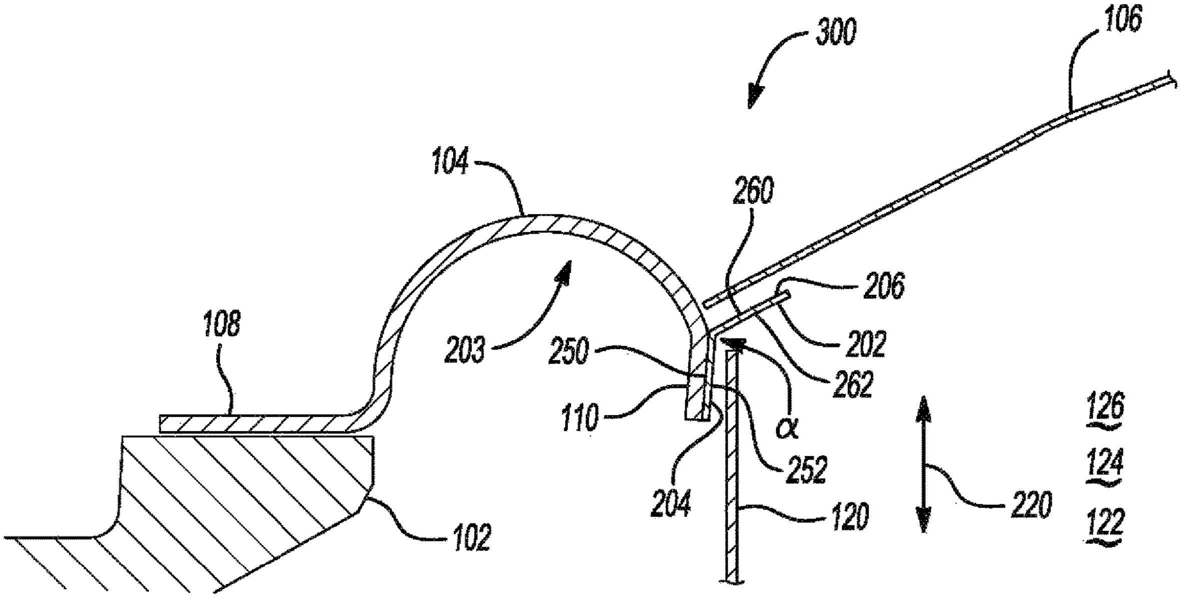
FIG. 4 depicts a loudspeaker assembly in accordance with another embodiment.

FIG. 4 generally illustrates a loudspeaker assembly 300 in accordance with another embodiment. The assembly 300 is similar to the assembly 200 as noted above in connection with FIG. 3, however, the surround 104 includes the first radial portion 203 while the second radial portion 205 is removed. This condition may mitigate the potential for the assembly 300 to generate audio artifacts in the high frequency range as the voice coil 120 moves along a bi-directional vertical axis 220. For example, with the removal of the second radial portion 205 (see FIG. 3 for reference to the second radial portion 205), this condition eliminates excess slack in the surround 104 as the voice coil 120, the surround 104, the dome 106, and the bearing ring 202 move along the axis 220.

As shown, the second end 110 of the surround 104 (e.g., only the first radial portion 203) is attached to the first side 250 of the lower portion 204 of the bearing ring 202. The second end 110 of the surround 104 is generally parallel to the voice coil 120 while the second end 110 of the surround 104 is positioned on the first side 250 of the lower portion 204 of the bearing ring 202. The dome 106 is coupled to the first side 260 of upper portion 206 of the bearing ring 202. The interface formed at the surround 104, the dome 106, and the bearing ring 202 becomes stiffer (or harder) given the elimination of any excess slack or the elimination of flexing provided by the second radial portion 205, which may result in reduced negatively perceived audio artifacts.

As noted above, the bearing ring 202 may form a ramp-like structure to provide an interface for coupling the surround 104, the dome 106, and the voice coil 120 to one another. This may be advantageous since this enables the surround 104 and dome 106 to move vertically to provide the audio output by the assembly 200. It is recognized that the voice coil 120 may move while generating an audio output. The ramp-like structure (and/or the overall size) of the bearing ring 202 enables a stiffer (or stronger) interface at the surround 104, the dome 106 and the voice coil 120 since the ring 202 may be made from a stiff material or be able to provide more stiffness through construction design, e.g., by adding more adhesive. As also generally shown, the lower portion 204 and the upper portion 206 of the bearing ring 202 generally form the angle, a that is greater than 90 degrees to enable the surround 104 and the dome 106 to move vertically while the assembly 200 generates the audio output.

Figure 5:
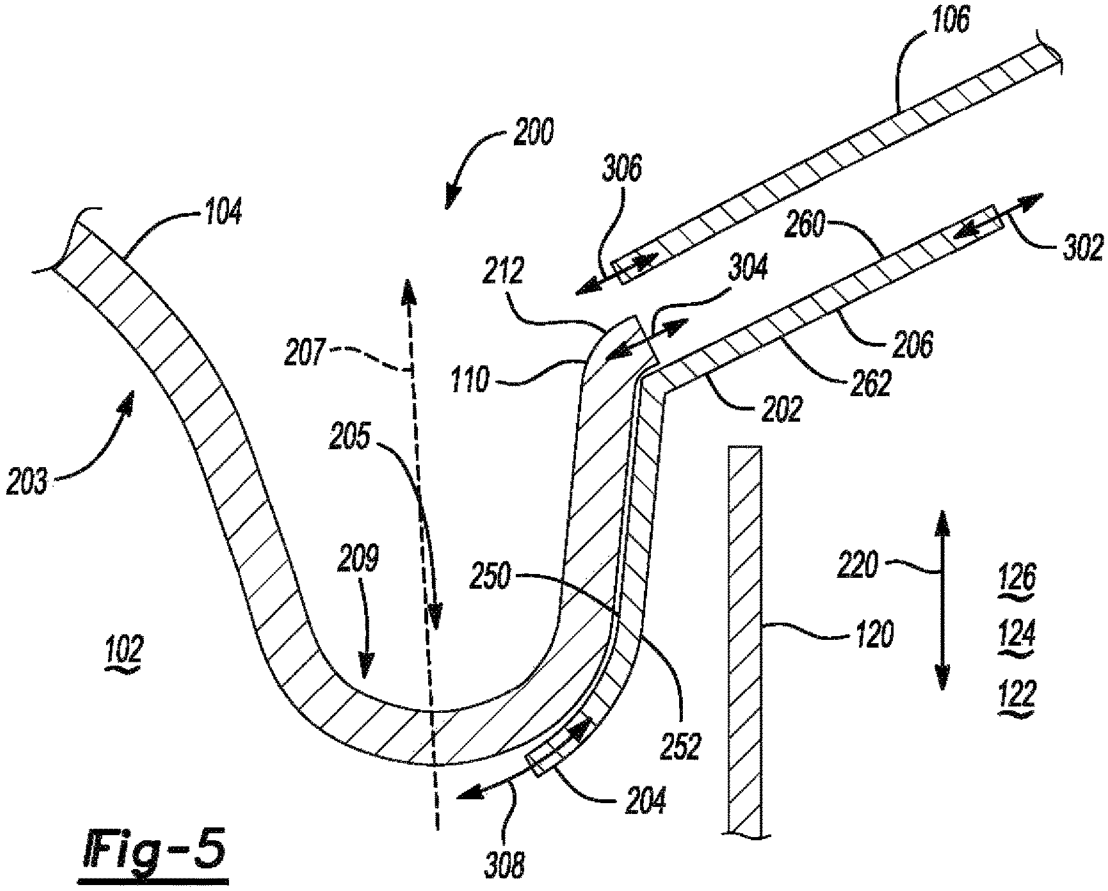
FIG. 5 depicts varying dimensions for the surround, the dome, and the bearing ring of the loudspeaker assembly as illustrated in connection with FIG. 3.

FIG. 5 depicts varying dimensions for the surround 104, the dome 106 and the bearing ring 202 of the assembly 200 as illustrated in connection with FIG. 3. As generally shown, an overall diameter (or length) of the surround 104 (e.g., the second end 110 of the surround 104) may be extended or reduced along an axis 304. In this example, the extending portion 212 of the surround 104 may be positioned at any length over the upper portion 206 of the bearing ring 202. In one example, the extending portion 212 of the surround 104 may be extended to a length to cover the upper portion 206 of the bearing ring 202, the shell pot 122, the magnet 124, and the core cap 126. Similarly, the extending portion 212 of the surround 104 may be positioned at any length on the lower portion 204 of the bearing ring 202. In this case, the extending portion 212 of the surround 104 may not be positioned directly over the bearing ring 202

An overall diameter of the dome 106 may be extended or reduced along an axis 306 relative to the bearing ring 202. It is recognized that the dome 106 may be positioned at any length on (or directly over) the upper portion 206 of the bearing ring 202. The dome 106 is also generally positioned over the shell pot 122, the magnet 124, and the core cap 126. An overall diameter of the bearing ring 202, (e.g., the upper portion 206 of the bearing ring 202) may be extended or reduced along an axis 302. For example, the upper portion 206 of the bearing ring 202 may extend at any length over the shell pot 122, the magnet 124, and the core cap 126. Additionally, the overall diameter of the lower portion 204 of the bearing ring 202 may be extended or reduced along an axis 308. In general, the second radial portion 205 of the surround 104 generally includes a central axis 207 that extends through a midpoint 209 of the second radial portion 205. Thus, in this regard, the lower portion 204 of the bearing ring 202 may extend at any length on a first side to the left of the midpoint 209 of the second radial portion 205 close to the supporting ring 102. In another example, the lower portion 204 of the bearing ring 202 may be positioned at any length on a second side to the right of the midpoint 209 of the second radial portion close to the voice coil 120. By providing the ability to vary the overall diameter (or length) of the foregoing aspects, different advantages may be achieved such as the removal of disruptive artifacts, etc. It is recognized that the overall thickness for the surround 104, the dome 106 and the bearing ring 202 may also change based on a desired criteria of a particular implementation.

Figure 6:
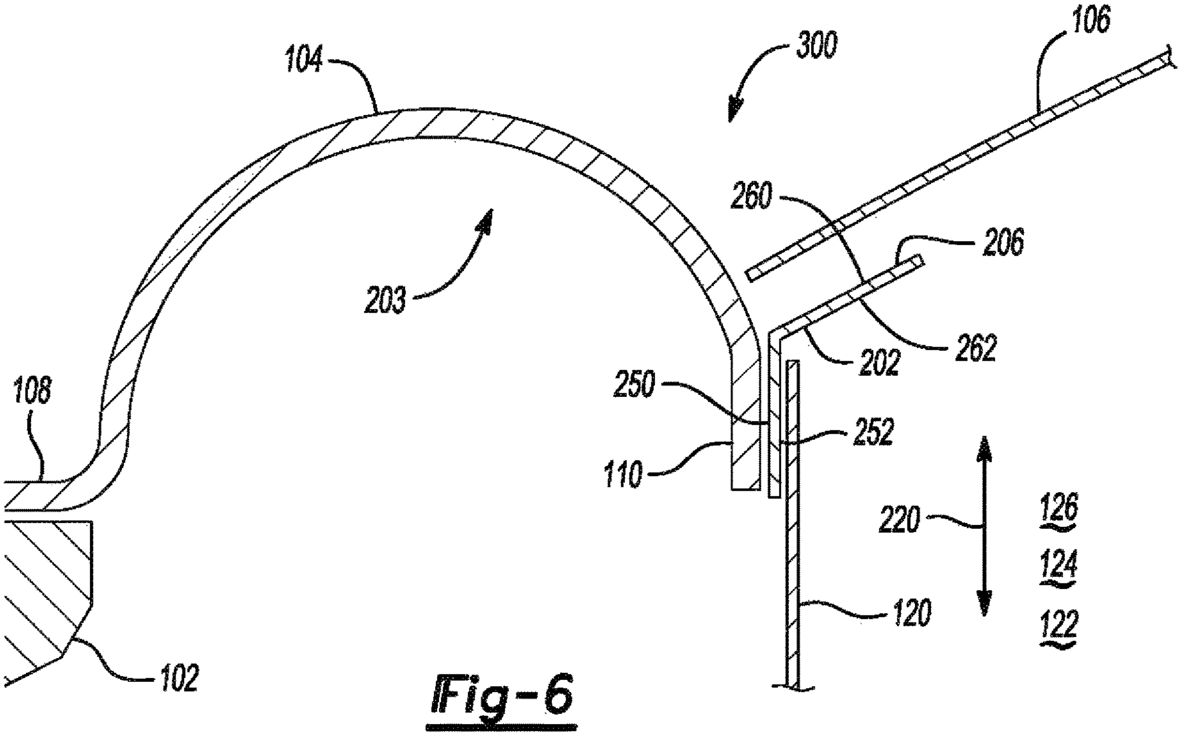
FIG. 6 depicts an interface formed of the surround, the dome, and the bearing ring of the loudspeaker assembly as illustrated in connection with FIG. 4.

FIG. 6 depicts an interface formed by the surround 104, the dome 106, and the bearing ring 202 of the loudspeaker assembly 300 as illustrated in connection with FIG. 4. In general, the voice coil 120 and the bearing ring 202 may be pre-assembled and coupled to one another prior to the final assembly of the loudspeaker assembly 300. The bearing ring 202 may be part of the voice coil 120. It is recognized that the surround 104, the voice coil 120, and the bearing ring 202 may be provided to any one or more of the loudspeaker assemblies as set forth herein as a pre-assembled component.

Figure 7:
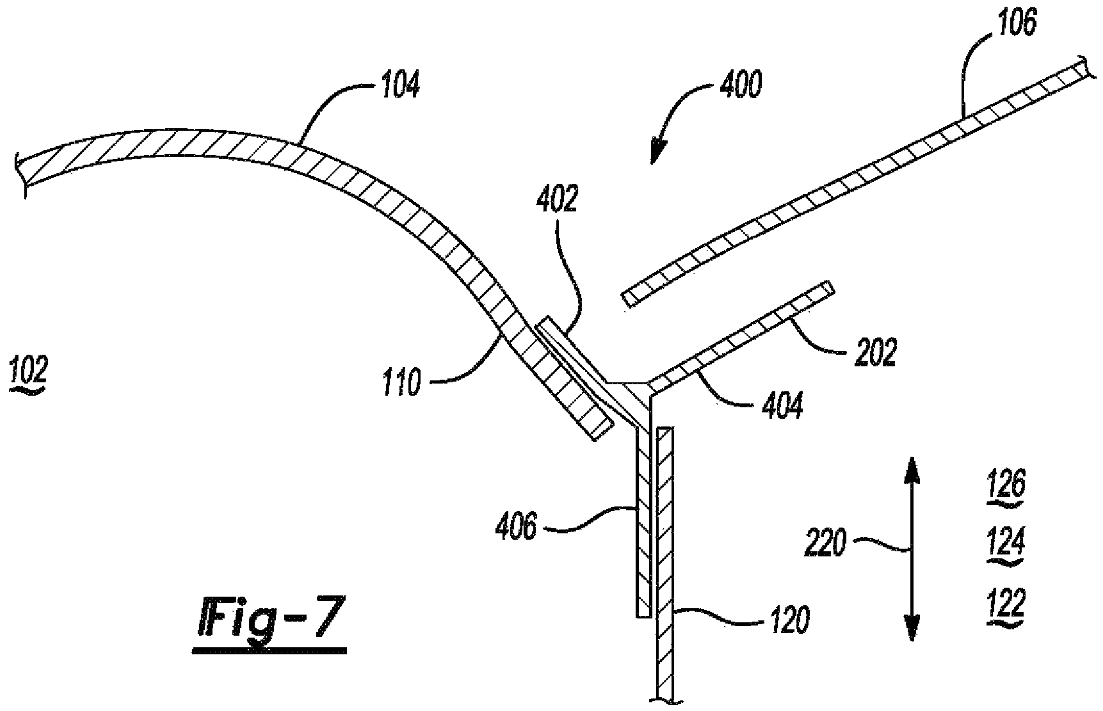
FIG. 7 depicts a loudspeaker assembly in accordance with another embodiment.

FIG. 7 depicts a loudspeaker assembly 400 in accordance with another embodiment. The bearing ring 202 may be formed of a first extending portion 402, a second extending portion 404, and a third extending portion 406. As shown, the first extending portion 402 is coupled to a top portion of the second end 110 of the surround 104. The second extending portion 404 is coupled to a bottom portion of the dome 106 and the third extending portion is coupled of a side portion of the voice coil 120. In this case, the second end 110 of the surround 104 is positioned adjacent to the third extending portion 406. The voice coil 120 is positioned adjacent to the second extending portion 404. The dome 106 is positioned adjacent to the first extending 402.

Figure 8:
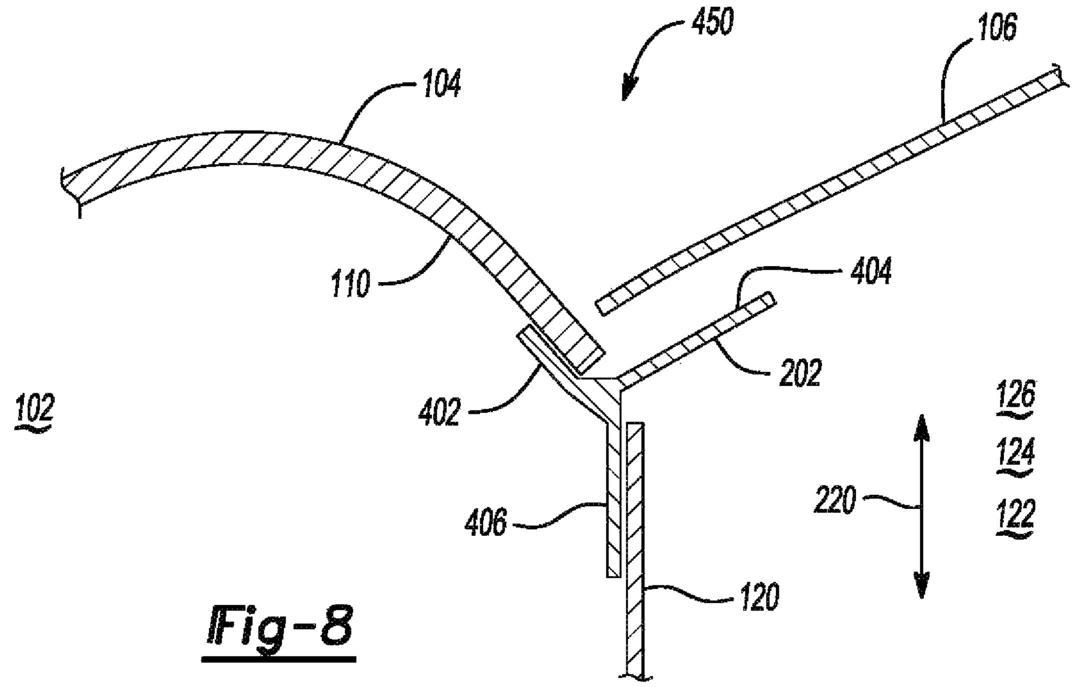
FIG. 8 depicts a loudspeaker assembly in accordance with another embodiment.

FIG. 8 depicts a loudspeaker assembly 450 in accordance with another embodiment. The loudspeaker assembly 450 also includes the first extending portion 402, the second extending portion 404, and the third extending portion 406. However, the manner which the first extending portion 402 is coupled to the second end 110 of the surround 104 differs from that of the loudspeaker assembly 400 as set forth in connection with FIG. 7. For example, a top portion of the first extending portion 402 is coupled to an underside of the second end 110 of the surround 104. The second portion 110 of the surround 104 is positioned adjacent to the third extending portion 406. The voice coil 120 is positioned adjacent to the second extending portion 206 and the dome 106 is positioned adjacent to the second portion 110 of the surround 104. In general, the assemblies 400 and 450 illustrate that the bearing ring 202 may be attached to the surround 104 and the dome 106 in different ways.

Figure 9:
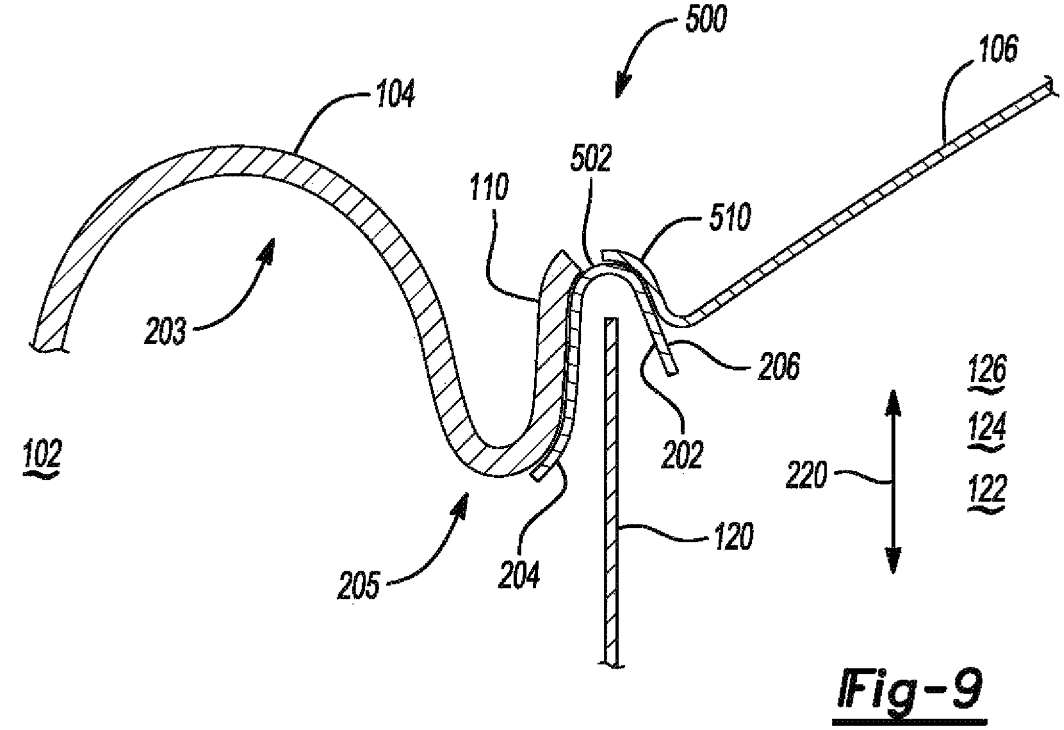
FIG. 9 depicts a loudspeaker assembly in accordance with another embodiment.

FIG. 9 depicts a loudspeaker assembly 500 in accordance with another embodiment. FIG. 9 generally illustrates that the bearing ring 202 may be generally U-shaped having a central portion 502 that may be positioned on a top side of the voice coil 120. The lower portion 204 of the bearing ring 202 is positioned on one side of the voice coil 120 and the upper portion 206 of the bearing ring 202 is positioned on another side of the voice coil 120. The second end 110 of the surround 104 may be attached to the lower portion 204 of the bearing ring 202. The dome 106 includes a curved portion 510 that attaches to the upper portion 206 of the bearing ring 202. As shown, the upper portion 206 of the bearing ring 202 may extend, detached past the curved portion 510 of the dome 106.

Figure 10:
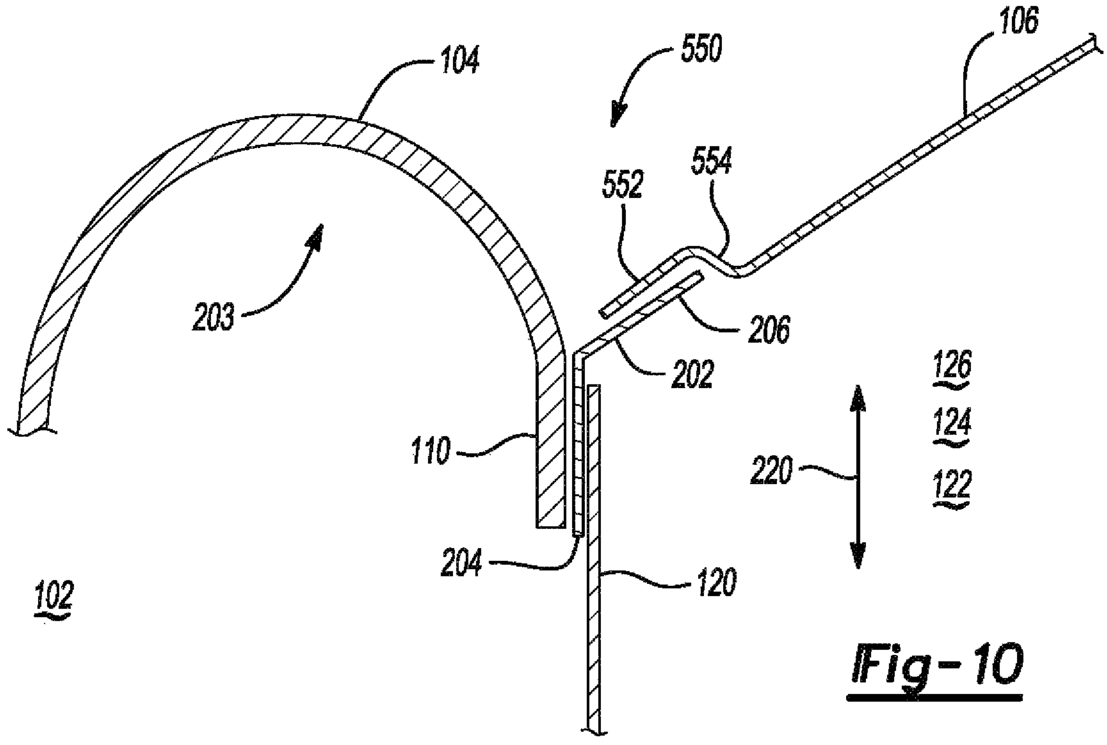
FIG. 10 depicts a loudspeaker assembly in accordance with another embodiment.

FIG. 10 depicts a loudspeaker assembly 550 in accordance with another embodiment. The upper portion 206 of the bearing ring 202 is formed as a ramp and a lower portion 552 of the dome 106 is attached to the upper portion 206. The dome 106 includes a step feature 554 that crosses an imaginary axis that extends outwardly from the upper portion 206. In this regard, the dome 106 extends below the bearing ring 202 and crosses the imaginary axis via the step feature 554 and then extends toward the surround 104 on the upper portion 206 of the bearing ring 202.

Figure 11:
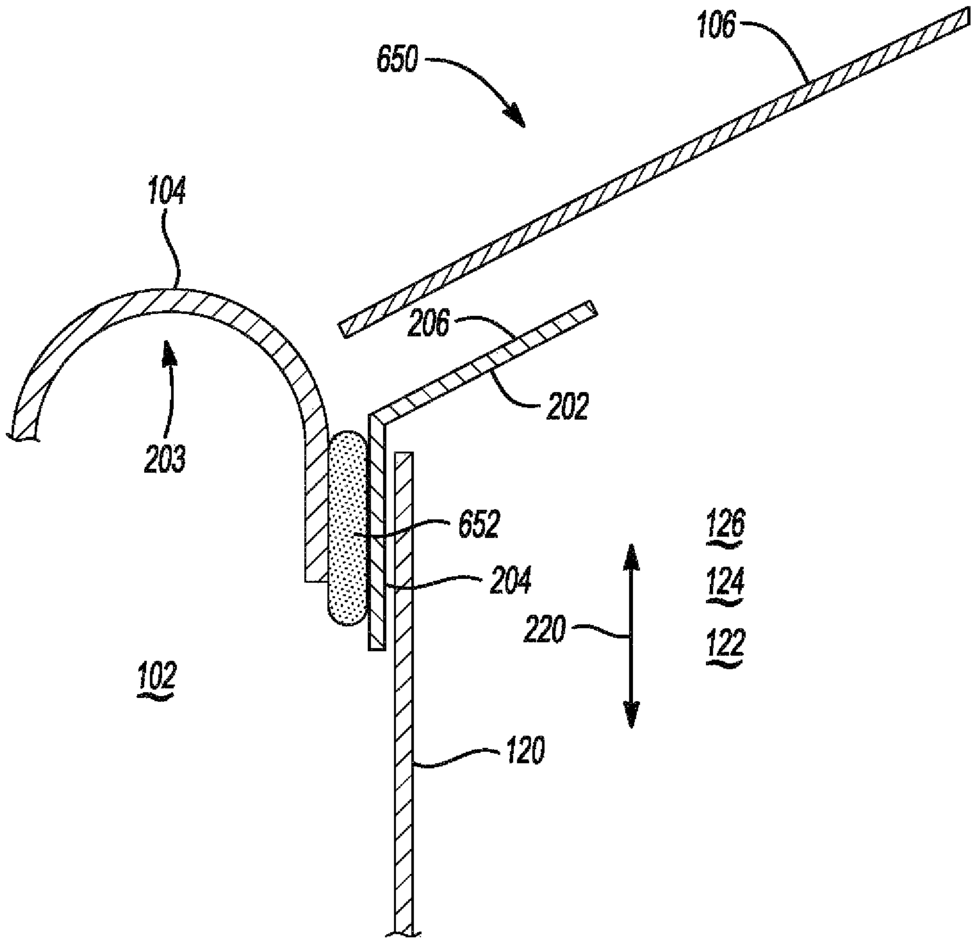
FIG. 11 depicts a loudspeaker assembly in accordance with another embodiment.

FIG. 11 depicts a loudspeaker assembly 650 in accordance with another embodiment. The assembly 650 is generally similar to the assembly 300 as set forth in connection with FIG. 6. However, the assembly 650 includes a reinforcement layer 652 that attaches the voice coil 120 to the bearing ring 202. In this regard, the reinforcement layer 652 along with the voice coil 120 and the bearing ring 202 may be shipped to the loudspeaker assembly manufacturer as a pre-assembled part. In one example, the reinforcement layer 652 may comprise a carbon fiber filament that is wound around the bearing ring 202 and/or the voice coil 120. The reinforcement layer 652 may add additional strength and support to the bearing ring 202 and the voice coil 120. The reinforcement layer 652 may also couple the surround 104, the voice coil 120, and the bearing ring 202 to one another. While not shown, the reinforcement layer 652 may be wrapped around the surround 104, the voice coil 120, and the bearing ring 202. The voice coil 120, the bearing ring 202, and the surround 104 may be provided as a pre-assembled component upon which the reinforcement layer 652 may then be added to attach the voice coil 120, the bearing ring 202, and the surround 104 to the dome 106.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A loudspeaker assembly comprising:
- a supporting ring;
- a flexible surround including a first end being attached to the supporting ring and a radial portion positioned opposite to the first end;
- a voice coil positioned about the flexible surround;
- a diaphragm positioned about the voice coil and the radial portion of the flexible surround; and
- a bearing ring being formed of a ramp structure, the bearing ring including a first portion receiving at least a portion of the diaphragm and a second portion being directly attached to the radial portion of the flexible surround, wherein the bearing ring is attached to the voice coil and separates the flexible surround from the diaphragm.

2. The loudspeaker assembly of claim 1, wherein the second portion of the bearing ring includes a first side to attach to the radial portion of the flexible surround and a second side to attach to the voice coil.

3. The loudspeaker assembly of claim 2, wherein the radial portion of the flexible surround is positioned opposite to the at least the portion of the diaphragm while positioned on the first side of the second portion of the bearing ring.

4. The loudspeaker assembly of claim 2, wherein at least a portion of the radial portion of the flexible surround is parallel to the voice coil as the radial portion of the flexible surround is directly attached on the first side of the second portion of the bearing ring.

5. The loudspeaker assembly of claim 4, wherein the first portion of the bearing ring and the second portion of the bearing ring form an angle that is greater than ninety degrees and is less than one hundred and eighty degrees.

6. The loudspeaker assembly of claim 1, wherein the assembly is a tweeter.

7. The loudspeaker assembly of claim 1, wherein the bearing ring is attached to the voice coil via adhesive.

8. The loudspeaker assembly of claim 1, wherein at least a portion of the radial portion of the flexible surround overlaps the second portion of the bearing ring as the second portion of the bearing ring is attached to the radial portion of the flexible surround.

9. A loudspeaker assembly comprising:
- a supporting ring;
- a flexible surround being attached to the supporting ring;
- a voice coil positioned about the flexible surround;
- a diaphragm positioned about the voice coil and a radial portion of the flexible surround; and
- a bearing ring being formed of a ramp structure, the bearing ring including a first portion being attached to at least a portion of the diaphragm and a second portion being directly attached to the radial portion of the flexible surround, wherein the bearing ring is attached to the voice coil and separates the flexible surround from the diaphragm.

10. The loudspeaker assembly of claim 9, wherein the assembly is a tweeter.

11. The loudspeaker assembly of claim 6, wherein the diaphragm is formed of one of diamond or Ceramic Metal Matrix Diaphragm.

12. The loudspeaker assembly of claim 9, wherein the first portion of the bearing ring and the second portion of the bearing ring form an angle that is greater than ninety degrees and is less than one hundred and eighty degrees.

13. The loudspeaker assembly of claim 9, wherein at least a portion of the radial portion of the flexible surround overlaps the second portion of the bearing ring as the second portion of the bearing ring is attached to the radial portion of the flexible surround.

14. A loudspeaker assembly comprising:
- a supporting ring;
- a flexible surround including a first end being attached to the supporting ring and a radial portion positioned opposite to the first end;
- a voice coil positioned about the flexible surround;
- a diaphragm positioned about the voice coil and the radial portion of the flexible surround; and
- a bearing ring being formed of a ramp structure, the bearing ring including a first portion attached to at least a portion of the diaphragm and a second portion being directly attached to the radial portion of the flexible surround, wherein the bearing ring is attached to the voice coil and separates the radial portion of the flexible surround from the diaphragm.

15. The loudspeaker assembly of claim 14, wherein the first portion of the bearing ring and the second portion of the bearing ring form an angle that is greater than ninety degrees and is less than one hundred and eighty degrees.

16. The loudspeaker assembly of claim 14, wherein at least a portion of the radial portion of the flexible surround overlaps the second portion of the bearing ring as the second portion of the bearing ring is attached to the radial portion of the flexible surround.

* * * * *